(12) United States Patent  
Reindle et al.

(10) Patent No.: US 6,725,986 B2
(45) Date of Patent: Apr. 27, 2004

(54) AUTO-FEED/REWIND ELECTRIC CORD REEL

(75) Inventors: Mark E. Reindle, Sagamore Hills, OH (US); David Kisela, Cuyahoga Falls, OH (US); Rick W. Walker, Stow, OH (US)

(73) Assignee: Royal Appliance Mfg. Co., Glenwillow, OH (US)

( * ) Notice: Subject to any disclaimer, the term of this patent is extended or adjusted under 35 U.S.C. 154(b) by 0 days.

(21) Appl. No.: 10/430,947

(22) Filed: May 7, 2003

(65) Prior Publication Data

US 2003/0209397 A1 Nov. 13, 2003

Related U.S. Application Data

(60) Provisional application No. 60/378,284, filed on May 7, 2002.

(51) Int. Cl.[7] .............................................. H02G 11/00
(52) U.S. Cl. .......................... 191/12.2 A; 191/12.2 R
(58) Field of Search ............................ 242/390, 390.2, 242/390.3, 393, 394, 390.8, 390.9; 191/12.2 A, 12 R, 12.2 R, 12.4, 125

(56) References Cited

U.S. PATENT DOCUMENTS

| 4,108,264 A | 8/1978 | Tanaka |
| 4,511,100 A | 4/1985 | Oetringhaus |
| 4,666,102 A | 5/1987 | Colbaugh et al. |
| 4,738,406 A | * 4/1988 | Lothamer ................ 242/480.7 |
| 5,498,940 A | 3/1996 | Kim et al. |
| 5,502,358 A | 3/1996 | Lee |
| 5,534,762 A | 7/1996 | Kim |
| 5,551,545 A | 9/1996 | Gelfman |
| 5,682,640 A | 11/1997 | Han |
| 5,841,259 A | 11/1998 | Kim et al. |
| 5,957,253 A | * 9/1999 | Clanton ................ 191/12.2 A |
| 6,149,096 A | 11/2000 | Hartley |
| 6,463,368 B1 | 10/2002 | Feiten et al. |
| 6,502,778 B2 | 1/2003 | Kim |
| 6,595,454 B2 | * 7/2003 | Roba et al. .............. 242/412.2 |
| 2002/0174506 A1 | 11/2002 | Wallach et al. |

FOREIGN PATENT DOCUMENTS

WO    WO 02/074150 A1    9/2002

* cited by examiner

*Primary Examiner*—Mark T. Le
(74) *Attorney, Agent, or Firm*—Fay, Sharpe, Fagan, Minnich & McKee, LLP

(57) ABSTRACT

An auto-feed/rewind electric cord reel device for controlling a power supply cord of an appliance includes a reel bracket on which a cord reel is rotatably mounted. A motor bracket is movably mounted in relation to the reel bracket and a linkage connects the reel bracket to the motor bracket. A first motor is included for selectively actuating the linkage and moving the motor bracket in relation to the reel bracket. A second motor is included and is spaced from the first motor. An assembly is driven by the second motor for selectively rotating the cord reel in at least one direction.

12 Claims, 7 Drawing Sheets

AUTO-FEED/REWIND ELECTRIC CORD REEL

This application claims the benefit of Provisional application No. 60/378,284, filed May 7, 2002.

BACKGROUND OF THE INVENTION

The present invention relates in general to a power supply cord retracting and dispensing apparatus and a method of managing the tension of the power supply cord in an appliance. Specifically, the apparatus and method for managing the tension of the power cord involves retracting and dispensing the power supply cord in association with movements of the appliance relative to an electrical outlet.

In the typical autonomous or self-propelled appliance or robot, in order to dispense the electric cord from the appliance, the cord is forcibly pulled from a cord reel as the appliance moves away from an electrical outlet. In order to retract the cord into the appliance, a mechanism is pressed or actuated to cause the cord to be drawn into the appliance at a fairly high speed as urged by a spiral plate spring. As the distance increases between the appliance and the outlet, more tension is given to the cord by the spiral plate spring, thereby resulting in a higher speed by which the cord is drawn back into the appliance. Thus, in a conventional self-propelled corded appliance there are shortcomings in the way a power cord is dispensed from, and retracted towards, the appliance.

Accordingly, it is considered desirable to develop a new and improved cord management apparatus and method to solve the above problems. Additionally, it is an object of the present invention to maintain and manage a minimal force of tension on the cord at all times regardless of a distance between the appliance and the outlet.

BRIEF SUMMARY OF THE INVENTION

One aspect of the present invention relates to an auto-feed/rewind electric cord reel. More particularly in accordance with this aspect of the invention, an apparatus is provided for controlling a power supply cord of an appliance comprising a reel bracket on which a cord reel is rotatably mounted. A motor bracket is movably mounted in relation to the reel bracket. A linkage connects the reel bracket to the motor bracket. A first motor selectively actuates the linkage and moves the motor bracket in relation to the reel bracket. A second motor is provided, spaced from the first motor, for driving an assembly which selectively rotates the cord reel in at least one direction.

In accordance with another aspect of the invention, a method is provided for managing the tension on an electric power supply cord of an appliance, the cord being wound on a rotary cord reel carried by the appliance for effecting a dispensing and a retraction of the cord. The method comprises the steps of: sensing an axial force on the cord corresponding to movements of the appliance; selectively retracting the cord when no axial force on the cord is sensed; and, selectively dispensing the cord when an axial tension of a predetermined minimum amount is sensed.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof and wherein.

DETAILED DESCRIPTION OF THE PREFERRED EMBODIMENT

Figure 1:
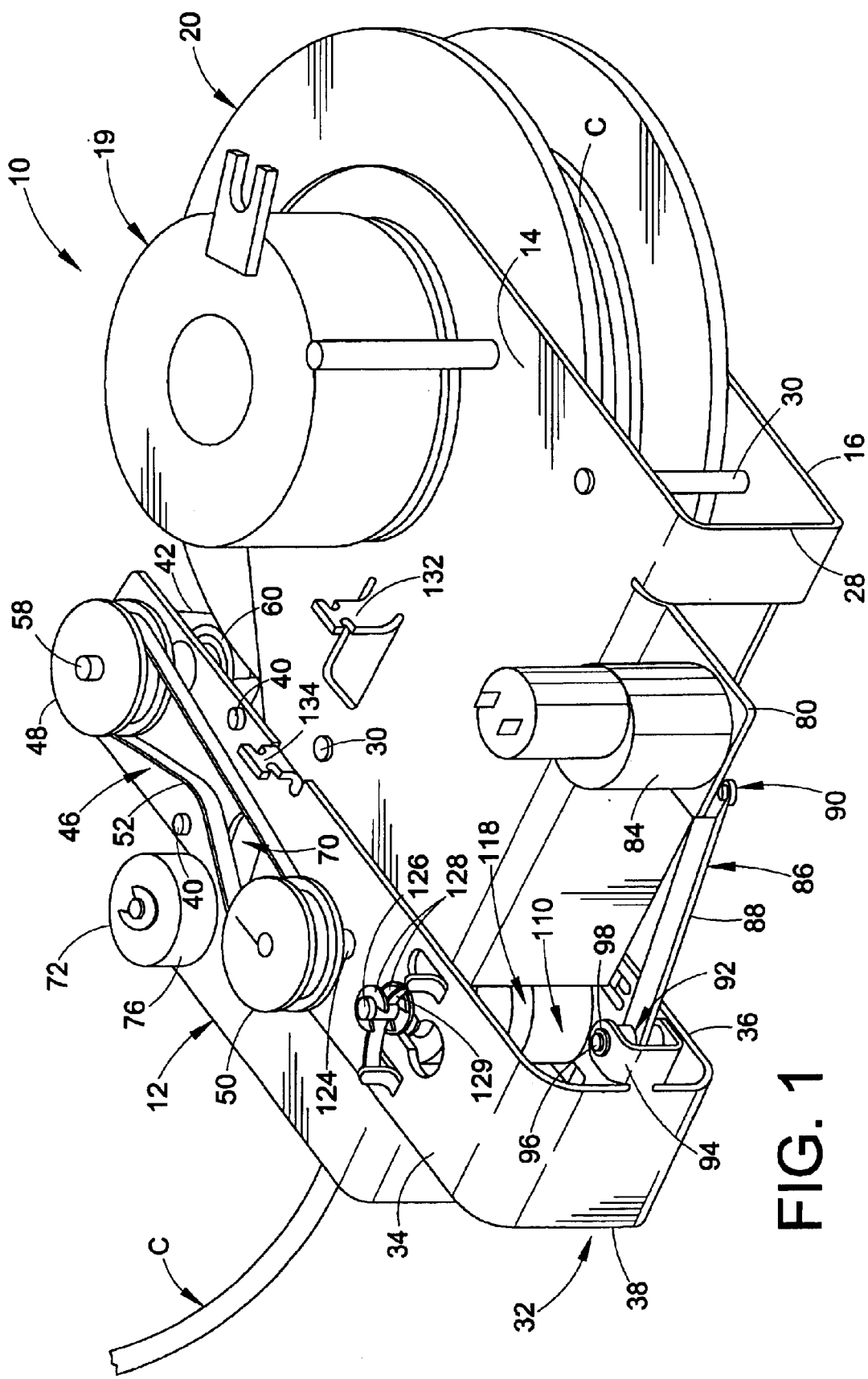
FIG. 1 is a top perspective view of an auto-feed/rewind electric cord reel according to the present invention.

Referring now to the drawings, wherein the showings are for the purposes of illustrating a preferred embodiment of the invention only and not for purposes of limiting same, there is shown a particular type of auto-feed/rewind electric cord reel (cord managing) device 10 in which the tension keeping features of an electric power cord C are embodied. The device can be used in connection with any type of corded appliance which moves in relation to a wall outlet that the power cord C is plugged into.

The operation of an embodiment of the present invention will now be explained in detail with reference to the accompanying drawings. However, it should be appreciated that the device 10 could also take many other configurations than those illustrated in the drawings.

Figure 2:
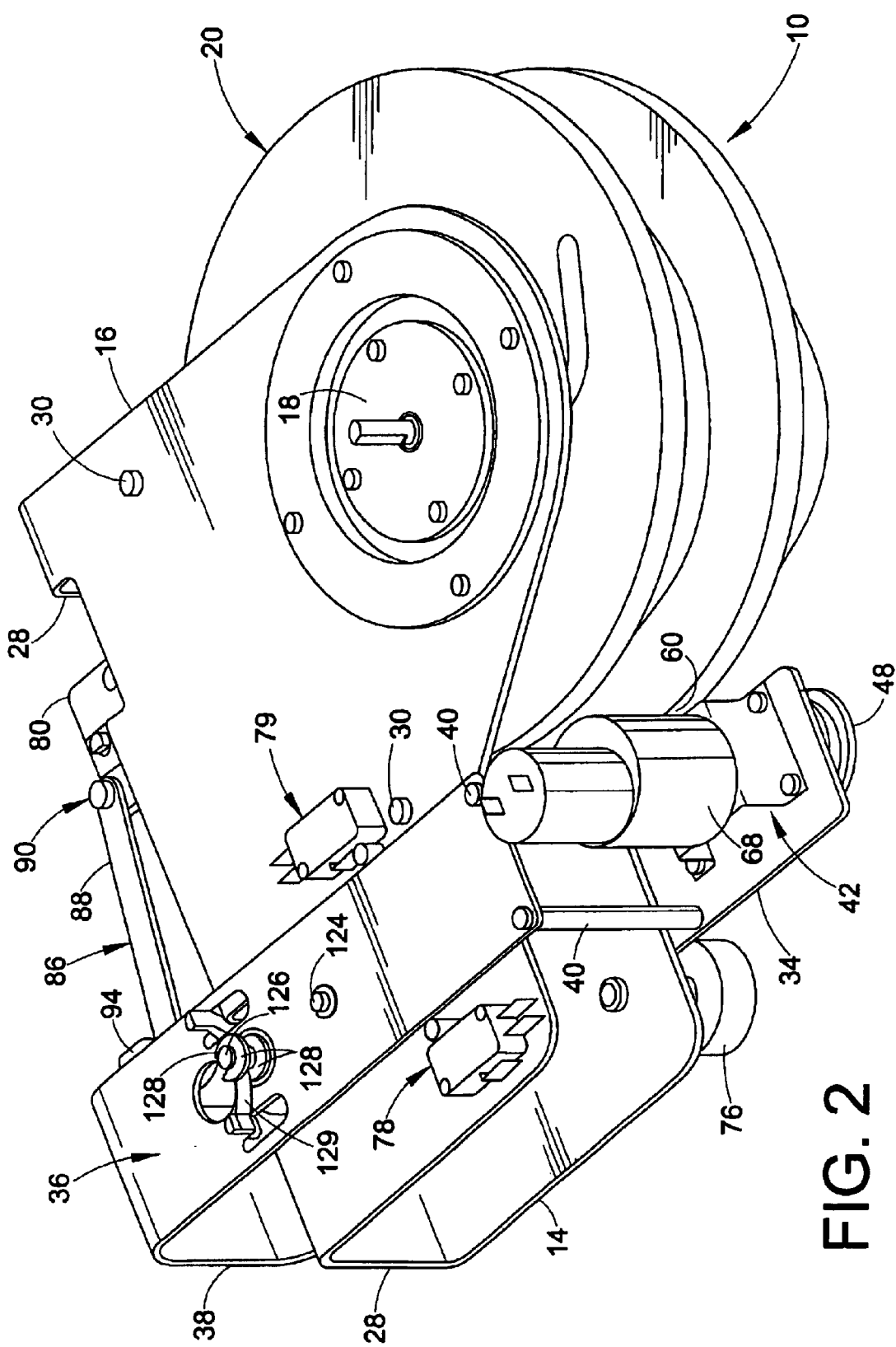
FIG. 2 is a bottom perspective view of the auto-feed/rewind electric cord reel of FIG. 1.

FIGS. 1 and 2 are perspective views from the top and bottom, respectively, showing the electric power cord managing device 10 for managing an electric power supply cord C in order to supply power to an appliance A. The appliance can, for example, be an autonomous vacuum cleaner.

Referring to FIG. 1, the electric power cord managing device 10 includes a reel bracket 12. The reel bracket 12 has an upper plate 14 and a lower plate 16 with a hub 18 (FIG. 2) therebetween. A cord reel or spool 20 is rotatably mounted about the hub 18 between the upper 14 and lower 16 plates. The hub 18 may incorporate the use of a slip ring assembly 19 to assist in controlling the rotational movements of spool 20. The upper 14 and lower 16 plates are further supported by a connecting plate 28 and a plurality of fixedly attached support posts 30 extending orthogonally between the plates 14, 16 The electric power cord C selectively winds (retracts) and unwinds (dispenses) around the cord reel 20 as will be described hereinafter.

The cord managing device 10 also includes a motor bracket 32 which is movably mounted in relation to the reel bracket 12. The motor bracket 32 includes an upper plate 34 and a lower plate 36. With reference now to FIG. 2, the plates 34, 36 are supported by a fixedly attached connecting plate 38 and support posts 40 extending orthogonally between the plates 34, 36. Mounted to the upper plate 34 of the motor bracket 32 is a belt pulley assembly 46, as shown in FIG. 1. The belt pulley assembly 46 comprises a first pulley 48 and a second pulley 50. Looped around the first and second pulleys 48, 50 is a belt 52 which rotatably connects the first and second pulleys 48, 50 to each other.

Figure 3:
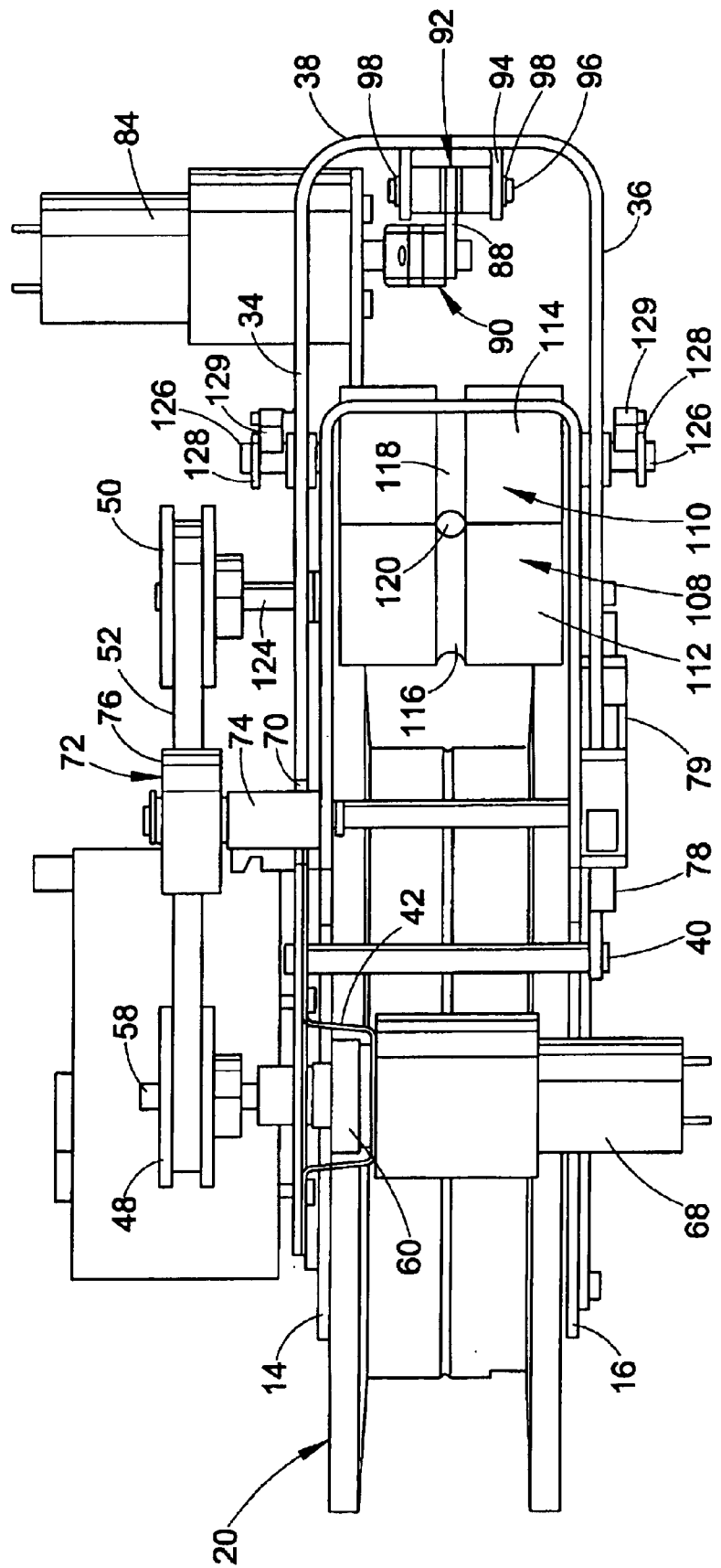
FIG. 3 is a front elevational view of the auto-feed/rewind electric cord reel of FIG. 1.

With reference now to FIG. 3, the first pulley 48 has a shaft 58 extending through the upper plate 34 of the motor bracket 32. A motor mount 42 is connected to the upper plate 34. Rotatably connected to the shaft 58 between the upper plate 34 and the motor mount 42 is a friction wheel 60. The shaft 58 is connected below the motor mount 42 to a motor 68, such as direct current motor, which can be selectively rotated for turning the shaft 58, the friction wheel 60, and the first pulley 48 in a right or clockwise direction. In one embodiment, the motor 68 is rotated in one direction only.

With reference again to FIG. 1, the upper plate 34 of the motor bracket 32 includes a curvilinear slot 70. The upper plate 14 of the reel bracket 12 includes a tensioning device 72 mounted thereon proximal to the motor bracket 32. As shown in FIG. 3, the idler device 72 has a shaft 74 and a friction wheel 76 rotatably mounted thereon. The friction wheel 76 is aligned with the belt 52 and can rotate about its shaft 74 when the wheel 76 selectively contacts and tensions the belt 52. The shaft 74 is sized to be received within the curvilinear slot 70 on the upper plate 34 of the motor bracket 32.

As best seen in FIG. 1, the reel bracket 12 includes a mounting flange 80 which supports a motor 84. The motor can be a direct current (DC) motor. The motor 84 can be rotated in both clockwise and counterclockwise directions when, for example, the polarity of a 12V direct current voltage applied to a positive (+) terminal and a negative (−) terminal of the motor 84 changes. The switching of rotational direction of the motor 84 can be regulated by a known microprocessor or electronic control unit (not shown) with input from a series of sensors in communication with the microprocessor. Similarly, the selective rotation of the motor 68 can be regulated by the microprocessor with input from the series of sensors in communication with the microprocessor. The sensors may comprise optical recognition sensors using optical (vision) cameras to detect markings on the cord. Alternatively, the sensors may comprise torsion sensors or tension sensors in the form of push/pull gauges. Additionally, as shown in FIG. 2, a pair of position sensing devices 78, 79, i.e. microswitches, in communication with the microprocessor, may be employed to determine the position of the motor bracket 32 with respect to the reel bracket 12.

It is to be appreciated that the cord device 10 could also operate in a manual mode in which an operator overrides the microprocessor and manually controls motors 68, 84. Overriding the microprocessor could be facilitated by a conventional switch (not shown) electrically connected to the microprocessor. The switch could have a setting for automatic and manual modes. Selecting the manual mode would further allow operator controlled selective rotation of the motors 68, 84. For example, a conventional rocker switch could be used to actuate rotation of motor 68 and/or to actuate rotation of motor 84. Additionally, the switch could provide a "neutral" or idle position to stop further rotation of motor 68.

A linkage mechanism 86 is connected to the reel bracket 12 and the motor bracket 32. The linkage mechanism includes an arm 88 connected at one end 90 to the motor 84. As best shown in FIG. 1, the link arm 88 is connected at another end 92 to a mounting bracket 94. The mounting bracket 94 is mounted to the connecting plate 38 of the motor bracket 32. Held by the mounting bracket 94 is a pin 96 passing through the link arm 88. Also provided are a pair of clips 98 for securing link end 92 to the mounting bracket. Thus, the link arm 88 is capable of pivotal movement in relation to the mounting bracket 94 and mounting flange 80.

As best seen in FIG. 3, mounted between the upper and lower plates 14, 16 of the reel bracket 12 is a pair of rollers 108, 110. The rollers 108, 110 are positioned adjacent to one another. Each has a surface perimeter 112, 114 including a respective groove 116, 118. The confluence of the grooves 116, 118 forms a generally circular opening 120 whereby the electric cord C may pass through. Roller 108 is rotatably mounted on a shaft 124 connected to the second pulley 50. Rotation of the second pulley 50 drivingly rotates the shaft 124 and the roller 108. Roller 110 is freely rotatable in both directions about a shaft 126. Shaft 126 is fixedly mounted to the upper and lower plates 34, 36 by a pair of clips 128 and support members 129 mounted at terminal ends of shaft 126 above plate 34 and below plate 36. Rotation of the first roller 108 in, for example, a clockwise direction, frictionally engages the second roller 110 and causes the second roller 110 to rotate in an opposite, i.e. counterclockwise, direction. The frictional engagement includes a squeezing action between the cord C and the rollers 108, 110 for dispensing the cord C through the opening 120.

Figure 4:
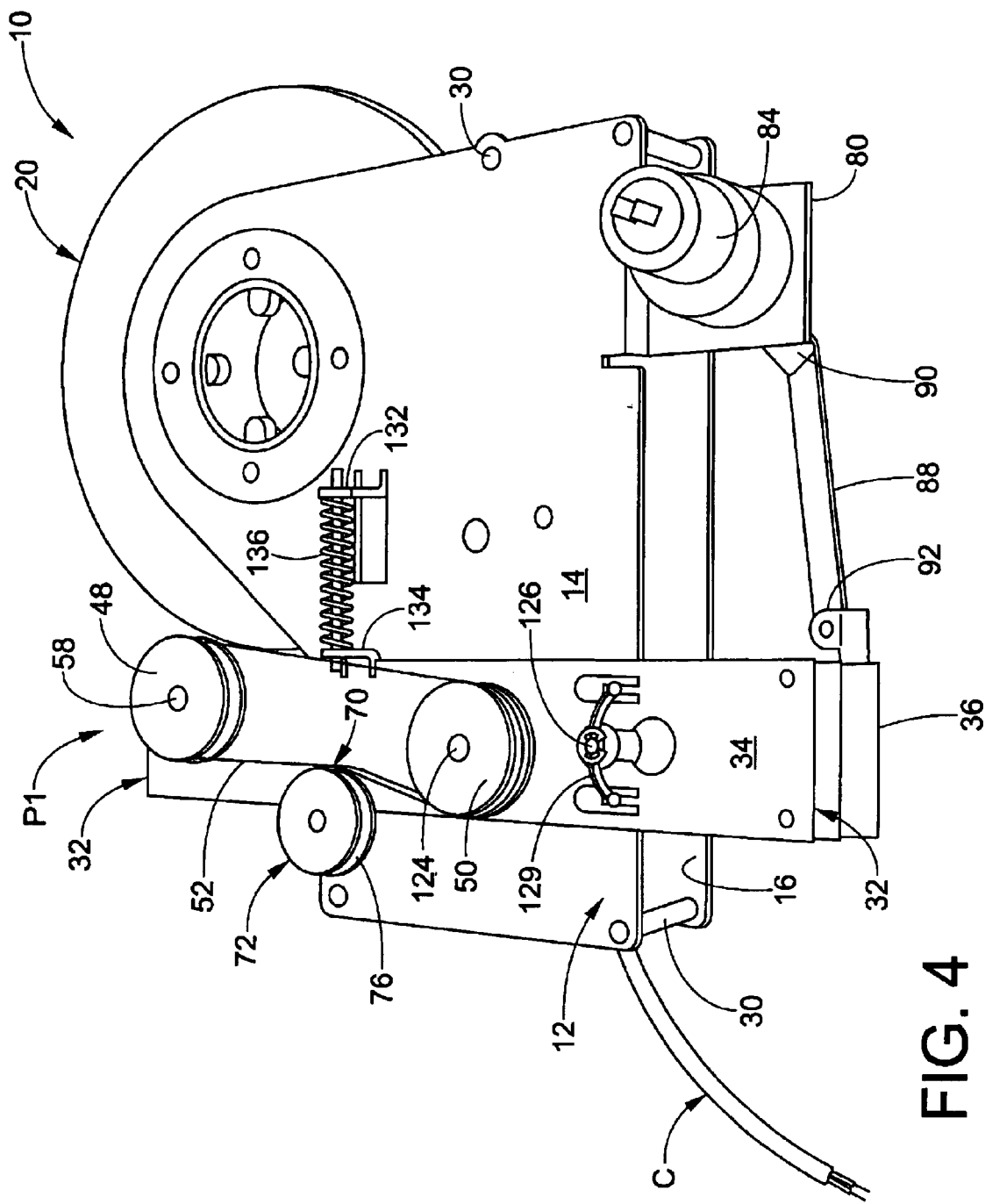
FIG. 4 is a perspective view of an auto-feed/rewind electric cord reel according to the present invention in a retracting orientation.
Figure 5:
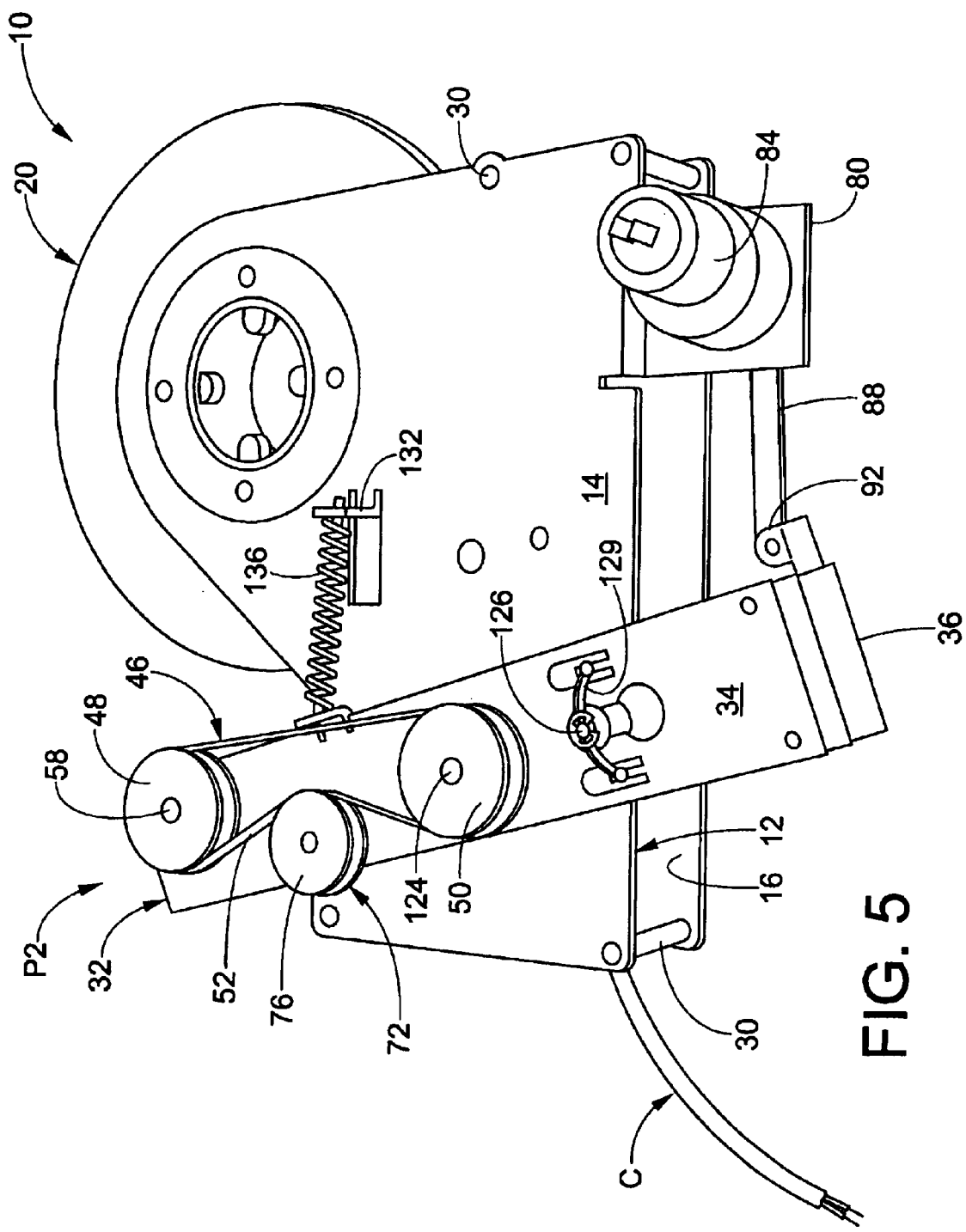
FIG. 5 is a perspective view of the auto-feed/rewind electric cord reel of FIG. 4 in a dispensing orientation.

The motor bracket 32 pivots about the shaft 124 of the first roller 108. As best seen in FIGS. 4 and 5, the motor bracket 32 pivots from a first position P1 to a second position P2 in response to the actuation of the motor 84 and linkage arm 88. In the first position P1, the wheel 60 connected to the shaft 58 of the first pulley 48 is frictionally engaged with the cord reel 20. The clockwise rotation of the wheel 60 rotates the cord reel 20 counterclockwise. Counterclockwise rotation of the cord reel 20 retracts the cord C towards and winds the cord about the reel 20. As shown in FIG. 4, the belt 52 between the first and second pulleys 48, 50 is at this time in a continuous slip condition. When the cord reel 20 is rotated to retract the cord C, the rollers 108, 110 idle against the cord C. In other words, the rollers 108, 110 idly rotate as the cord C passes through the opening 120 therebetween.

FIG. 5 shows the position of the cord reel device 10 in the second P2 or dispensing position. In position P2, the wheel 60 is disengaged from the cord reel 20 allowing the reel 20 to idle. At this time, the belt 52 is engaged with the idler wheel 76 whereby the belt pulley assembly 46 is engaged and the second pulley 50 is drivingly rotated. Rotation of second pulley 50 in a clockwise manner drivingly rotates the first roller 108. The cord C is forced between the two grooves 116, 118 of the rollers 108, 110. Thus, the cord C is dispensed from the cord reel 20 through the opening 120.

As seen in FIGS. 4 and 5, the upper plate 14 of the reel bracket 12 and the upper plate 34 of the motor bracket 32 each include a mounting bracket 132, 134. Secured to the mounting bracket is a spring 136. The spring 136 supplies a biasing/return force to assist movement of the motor bracket 32 from the second position P2 to the first position P1. Thus, the motor bracket 32 is urged to the first position P1 and only assumes position P2 when motor 84 is actuated.

Figure 6:
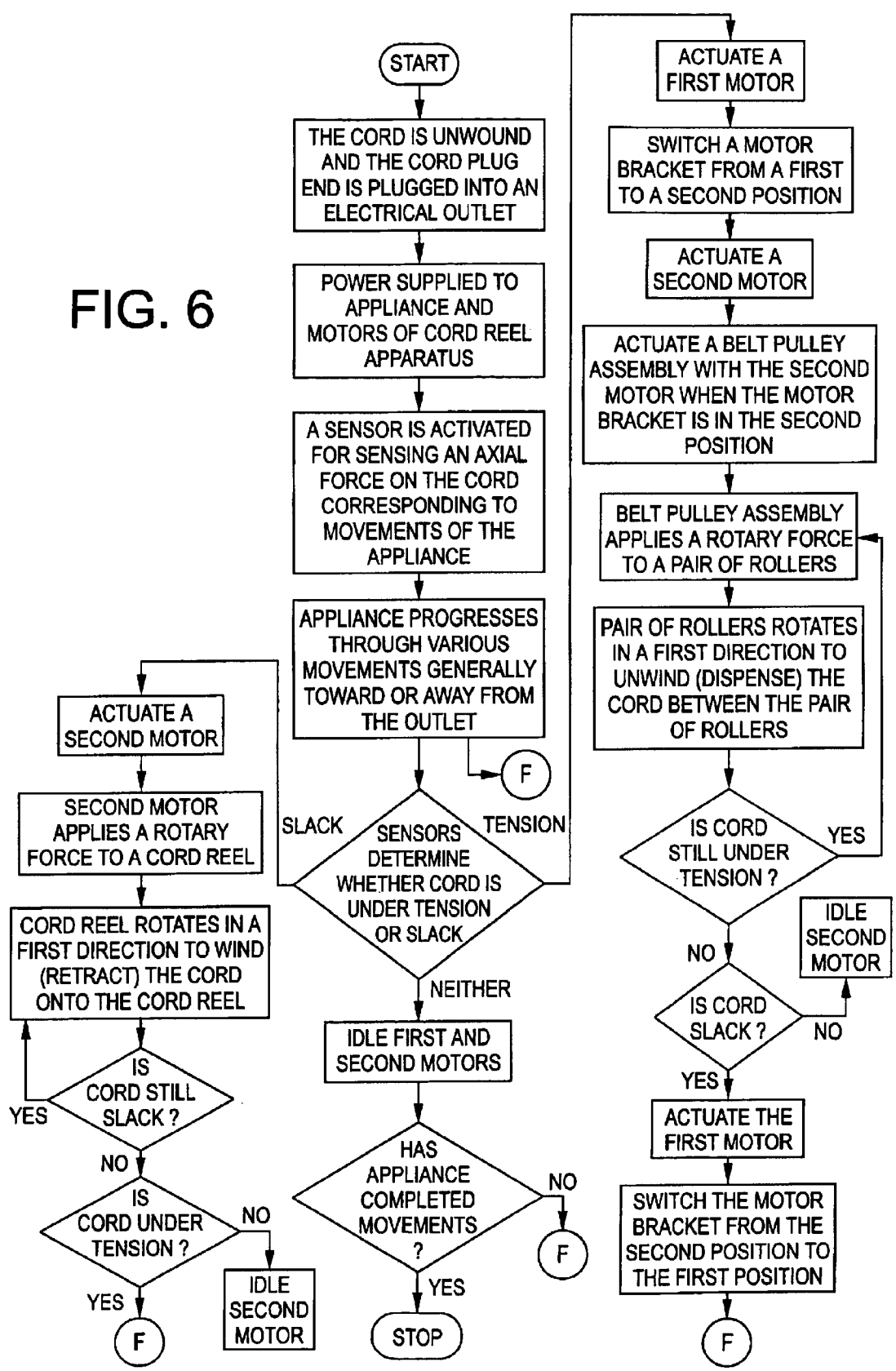
FIG. 6 is a flow chart of a tension keeping method of the auto-feed/rewind electric cord reel according to the present invention; and, FIG. 7 is a perspective view of the auto-feed/rewind cord device according to the present invention mounted to an appliance.

With reference now to the flow chart of FIG. 6, the method of managing the electrical cord C for an autonomous appliance A are displayed therein. The appliance A is moved to a location, and in order to supply power to the appliance A, the cord C is played out or unwound from the cord reel and the electric cord plug end is plugged into an electrical outlet. Power is supplied through the electric cord to the appliance and to the motors of the cord reel device. A sensor is activated for sensing an axial force on the cord corresponding to movements of the appliance. The appliance progresses through various movements generally toward or away from the electrical outlet. The sensors determine whether the cord is under tension, i.e. there is an axial force on the cord.

If the cord is slack, the lack of axial force on the cord is sensed and the cord reel device actuates a motor 68 which applies a rotary force to rotate the cord reel in a first direction to wind (retract) the power cord onto the cord reel. The sensors continually monitor whether the cord is still slack. If so, the cord reel continues to rotate in the first direction to wind the cord about the cord reel. If the cord is no longer slack, the motor 68 idles. If the cord comes under tension, the cord reel device actuates motor 84 which switches the motor bracket 32 from a first position to a second position. Actuation now of motor 68 drives the belt pulley assembly when the motor bracket is in the second position. The belt pulley assembly applies a rotary force to a pair of rollers which rotates the belt pulley assembly in a first direction to unwind (dispense) the electric cord between the pair of rollers.

The sensors continually monitor the axial force on the electric cord. If the cord is still under tension, the belt pulley assembly continues to drive the pair of rollers and dispense the electric cord accordingly. If the cord is no longer under tension but is not slack, then the motor 68 is idled. If the cord becomes slack again, then the motor 84 is actuated in order to switch the motor bracket from the second position (shown in FIG. 5) to the first position (shown in FIG. 4). The aforementioned steps repeat as the appliance progresses through its various movements. If the cord is no longer under tension and is not slack, then the motors 68, 84 are idled.

Figure 7:
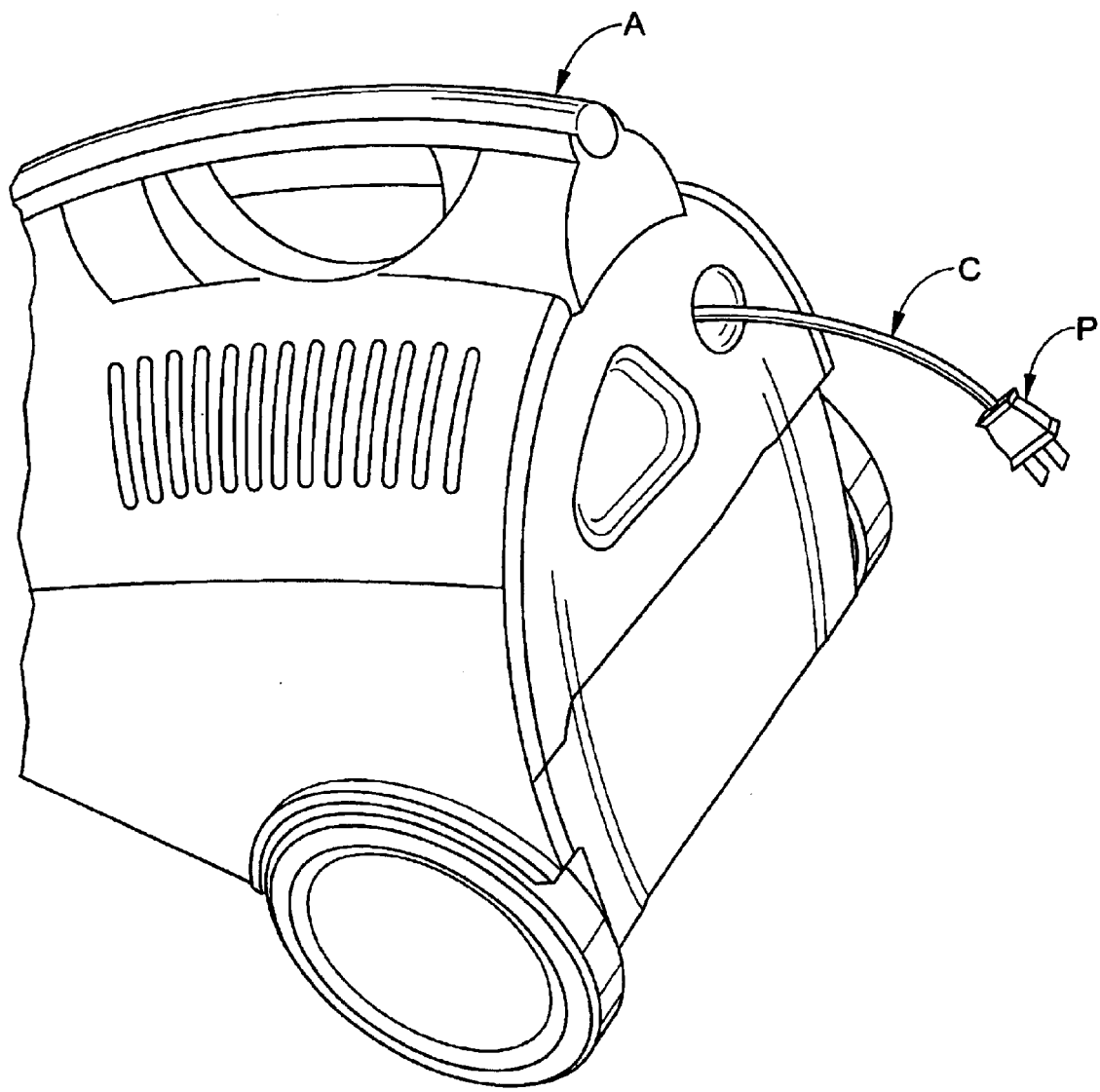

FIG. 7 displays one example of the mounting arrangement for securing the device 10 to an appliance A. More specifically, the appliance is illustrated as being a canister type vacuum cleaner. It is to be appreciated that the device 10 may be mounted in a vertical, horizontal, or other orientation within the appliance A. Also, while a canister type vacuum cleaner has been illustrated, the apparatus for controlling a power supply cord can also be used in connection with upright vacuum cleaners, carpet extractors, wet/dry vacuums and a variety of other powered home appliances, both indoor and outdoor. For example, the invention could be used in connection with electrically powered lawn mowers and a variety of other powered garden equipment from trimmers and edgers to power saws and the like.

The invention has been described with reference to a preferred embodiment. Obviously, modifications and alterations will occur to others upon the reading and understanding of this specification. It is intended to include all such modifications and alterations insofar as they come within the scope of the appended claims or the equivalents thereof

Having thus described the invention, it is claimed:

1. An apparatus for controlling a power supply cord of an appliance, comprising:
   a reel bracket on which a cord reel is rotatably mounted;
   a motor bracket movably mounted in relation to said reel bracket;
   a linkage connecting said reel bracket to said motor bracket;
   a first motor for selectively actuating said linkage and moving said motor bracket in relation to said reel bracket;
   a second motor spaced from said first motor; and,
   an assembly driven by said second motor for selectively rotating said cord reel in at least one direction.

2. The apparatus according to claim 1, wherein said assembly comprises a pair of rotating members.

3. The apparatus according to claim 2, wherein said pair of rotating members include a first pulley, a second pulley, and a belt looped around said first and second pulleys.

4. The apparatus according to claim 3, wherein said reel bracket comprises an idler device, said idler device includes a rotatable wheel aligned with said belt and selectively contacting said belt.

5. The apparatus according to claim 4, wherein said reel bracket includes a pair of rollers rotatably mounted on said reel bracket.

6. The apparatus according to claim 5, wherein said pair of rollers includes a first roller and a second roller, said first roller being rotatably secured to an output shaft of said second pulley.

7. The apparatus of claim 6, wherein said first roller is positioned adjacent to said second roller, and wherein said first roller and said second roller each have a perimeter including a groove defined therein.

8. The apparatus according to claim 1, wherein said reel bracket comprises a slip ring assembly connected to said cord reel.

9. The apparatus according to claim 1, further comprising a sensor which senses an axial force on said cord corresponding to movements of said appliance.

10. The apparatus according to claim 9, wherein said sensor comprises an optical recognition sensor.

11. The apparatus according to claim 9, wherein said sensor comprises a push/pull gauge.

12. The apparatus according to claim 1, wherein the reel bracket includes a screw conveyor on which a cord guide is mounted.

* * * * *